May 8, 1928.

O. NORMAN

FISH CUTTING MACHINE

Filed April 12, 1927     2 Sheets-Sheet 1

1,669,207

Inventor

Oscar Norman

By Harry Bowen

Attorney

May 8, 1928. 1,669,207
O. NORMAN
FISH CUTTING MACHINE
Filed April 12, 1927 2 Sheets-Sheet 2
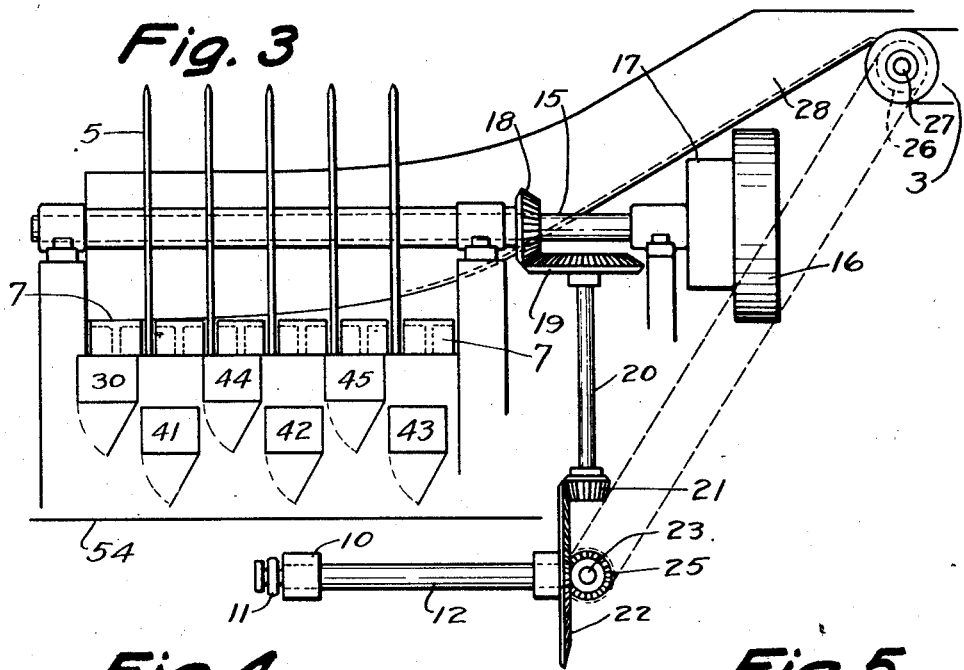
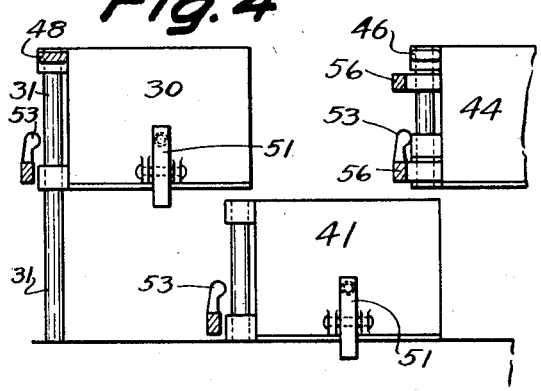
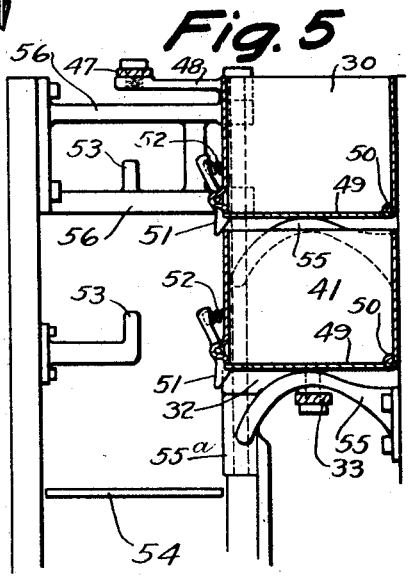
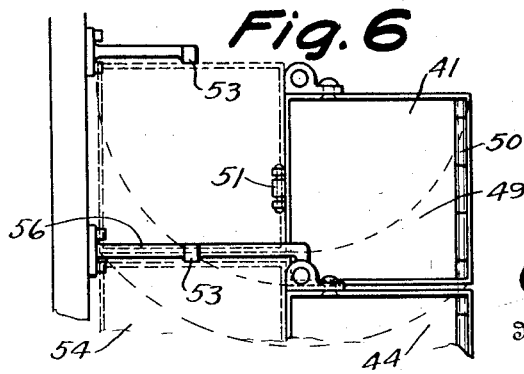
Inventor
Oscar Norman
By Harry Bowen
Attorney Patented May 8, 1928.

1,669,207

UNITED STATES PATENT OFFICE.

OSCAR NORMAN, OF SEATTLE, WASHINGTON.

FISH-CUTTING MACHINE.

Application filed April 12, 1927. Serial No. 183,034.

The invention is a machine for cutting fish in which the cut pieces are turned at a right angle and placed upon a conveyor so that they are in the proper position to be placed into cans.

The object of the invention is to provide a turning device for a cutting machine which will automatically receive the cut pieces and place them upon a conveyor in the proper position.

Another object of the invention is to provide means for operating the devices for turning which are automatically operated in conjunction with a device for feeding fish to the cutting knives.

Another object of the invention is to provide means for arranging a plurality of small rectangular shaped containers in a continuous row so that they may be turned.

A further object of the invention is to provide means for dumping the said containers automatically as they reach a predetermined position.

And a still further object of the invention is to provide means for receiving and turning pieces of fish from a cutting machine which are of a simple and economical construction.

With these ends in view the invention embodies a plurality of rotary cutting knives, a conveyor and a chute for feeding fish to the knives, a sliding tray for forcing the fish through the knives, a plurality of small rectangular shaped containers positioned to receive the fish from the knives means for turning the said containers through an angle of ninety degrees, means for dumping the said containers upon a conveyor and suitable means for operating the said knives, feeder and feeding conveyor.

Other features and advantages of the invention will be seen from the following description taken in connection with the drawings wherein.

Figure 3 is a front view with parts omitted.

Figure 4 is a view looking towards the machine showing the outside of the buckets.

Figure 5 is a view showing a cross section through an upper and lower bucket.

Figure 6 is a plan view showing the means for supporting the upper buckets and the two positions of the buckets.

Figure 1:
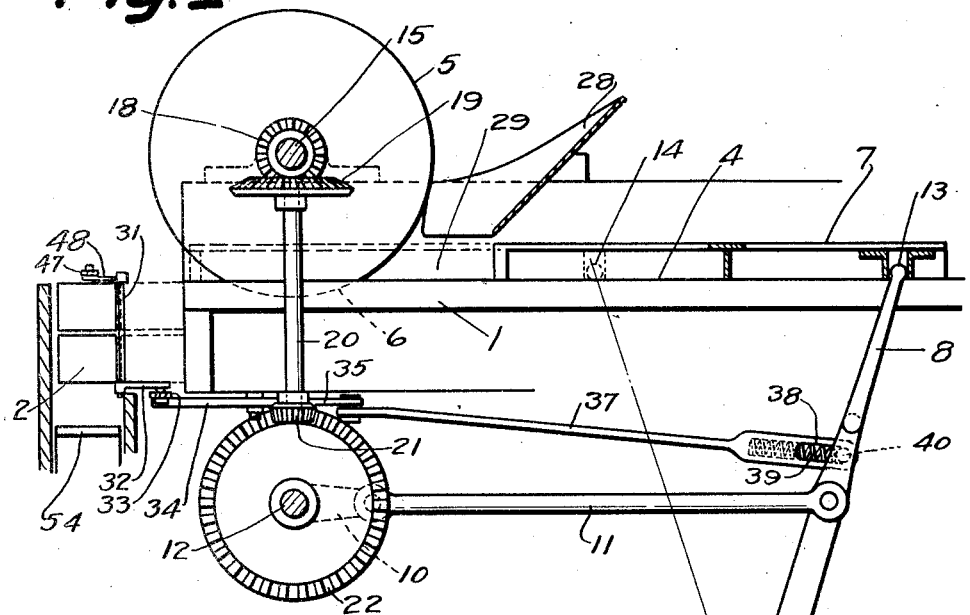
Figure 1 is a cross section showing the general construction of the machine.

In the drawings the device is shown as it would be made wherein numeral 1 indicates the main platform of the machine, numeral 2 the buckets, and numeral 3 a conveyor for feeding material to the machine.

It is understood that the machine frame may be of any suitable design and may be made of any suitable material. In the design shown the frame 1 is made with a flat surface 4 which is slotted to receive the rotary knives 5 as shown at the point 6. A sliding member as indicated by the numeral 7 is placed upon the surface 4 and it will be observed that this member may be moved backward and forward by a lever 8 which is pivoted at the point 9 and operated by an eccentric 10 through a rod 11. The eccentric 10 is mounted upon a shaft 12 and it will be observed that as this shaft rotates it will move the upper end of the lever 8 backward and forward from the position shown in full lines and indicated by the numeral 13 to the position shown in dotted lines and indicated by the numeral 14.

The knives 5 are mounted on a shaft 15 which may be driven from a counter shaft by a pulley 16 which is mounted on the end of the shaft as shown in Figure 3, and this pulley may be provided with a clutch as indicated by the numeral 17. A bevel gear 18 is also mounted on the shaft and this gear meshes with another gear 19 on a vertical shaft 20, and at the lower end of the vertical shaft is another gear 21 that meshes with a gear 22 on the shaft 12. At the other end of the shaft 12 is the eccentric 10 which operates the lever 8 through the rod 11, so that the slide 7 will be automatically moved backward and forward as the knives rotate. The gear 22 also meshes with another gear 23 on a shaft 24 and a sprocket 25 is also mounted on this shaft which drives a sprocket 26 on a shaft 27 through a chain. The shaft 27 is the head shaft of the conveyor 3 which delivers the fish to the machine. The conveyor 3 discharges the fish into a chute 28 so that they will slide downward lengthwise and drop into a space 29 behind the knives 5 and directly in front of the slide 7, and it will be observed that as the slide moves forward the fish will be forced through the knives by which it will be cut into small chunks and these chunks will drop into the buckets 2.

The buckets 2 are of a rectangular shape as shown and are pivotally mounted and provided with suitable levers whereby they may be turned through an angle of ninety degrees so that they will change the position of the fish and permit it to drop upon a conveyor operating transversely to the axis of the knives, in a lengthwise position.

Figure 2:
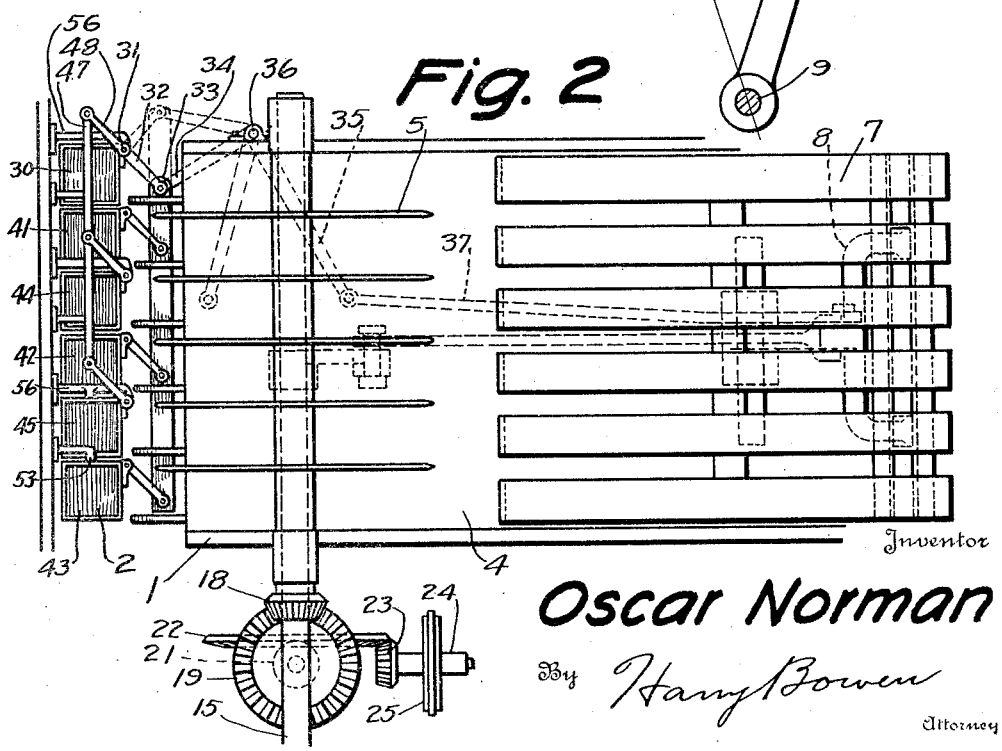
Figure 2 is a plan view of the machine.

These buckets are arranged in an upper and lower set so that they may be turned without interfering. The bucket at one end of the machine, which will be known as the head end and which will be hereinafter termed as the first bucket and indicated by the numeral 30, is mounted upon a vertical shaft 31. At the lower end of this shaft is a lever 32 which is pivotally attached to a bar 33 and another lever 34 as shown in Figure 2. The lever 34 is made integral with another lever 35 which is pivotally mounted on a pin 36 at one side of the frame, and the opposite end of the lever 35 is attached to the lever 8 through a bar 37 as shown in Figure 1. The bar 37 is provided with a slotted opening 38 having a spring 39 therein and which is placed over a pin 40 on the lever 8. It will be observed that as the lever 8 moves towards the knives from the position shown in full lines in Figure 1 it will immediately operate the buckets to the position shown in dotted lines in Figure 2 and after the buckets have reached this position the spring 39 will compress and permit the lever to move the remaining distance without operating the buckets so that the buckets will be in position before the chunks of fish are dropped into them. The buckets 41, 42 and 43 are also attached through levers 32 to the bar 33 so that they will move with the bucket 30 and the buckets 44 and 45 which are in the upper position are attached by levers 46 and a bar 47 to a lever 48 at the upper end of the pin 31 so that these buckets will also move in unison with the former set of buckets. All of the buckets will therefore move at the same time in both directions. The bottoms of the buckets which are indicated by the numeral 49 are hinged at the point 50 and the opposite sides of the bottoms are held by latches 51 which are pivotally mounted on the outer sides of the buckets and held in the locked position by springs 52. It will be observed that as the buckets move outward the upper ends of the latches 51 will engage stops 53 as shown in Figure 6, which will operate the latches to release the bottoms so that the bottoms will drop downward and drop the pieces of fish contained therein upon a transverse conveyor which is indicated by the numeral 54. The buckets will then return through the reverse action of the lever 8 and as they return the bottom plates will engage curved arms 55 which will force them upward so that they will be held by the spring latches 51. They will then be in position to receive pieces of another fish and as the operation is continuous they will then repeat the operation and place the fish upon the conveyor 54.

The lower row of buckets are supported upon the vertical shafts upon which they are mounted and the shafts are supported in bearings 55ᵃ which are mounted on the edge of conveyor 54 as shown in Figure 5. It will be understood however that the shafts may be mounted in any suitable manner or the buckets supported in any suitable manner. The upper rows of buckets are also supported on vertical shafts, and the shafts are mounted in brackets 56 as shown in Figure 5. These buckets may also be mounted in any suitable manner.

It will be understood that other changes may be made in the construction without departing from the spirit of the invention, one of which changes may be in the design or arrangement of the buckets, another may be in the use of other means for turning and dumping the buckets, another may be in the use of other means for feeding the fish to the knives, and still another may be in the arrangement of the shaft, gears and levers for operating the machine or parts thereof.

The construction may be readily understood from the foregoing description. To use the device it may be constructed and assembled as shown and described and it will be observed that as the fish is fed from the conveyor 3 to the chute 28 and to the knives it will be forced through the knives by the member 7 and the cut pieces of the fish will drop into the buckets 3 which will turn them and place them upon the conveyor 54 as hereinbefore described. This will accomplish a very desirable result as it places the cut pieces of fish in the proper position so that they are ready to be placed into cans. The actual design of the frame of the machine is immaterial and therefore many parts thereof have been omitted.

Having thus fully described the invention what I claim as new and desire to secure by Letters Patent, is:

1. In a machine of the class described, a plurality of rotary cutting knives, means for feeding a fish to the knives, means for forcing a fish through the knives, means for receiving the cut pieces of fish and means for operating the said receiving means to turn the individual pieces of fish independently through a right angle and place them upon a conveyor.

2. In a device of the class described, a plurality of cutters, means for feeding objects to the cutters, means for receiving the cut pieces of objects and means for operating the said receiving means to change the position of the cut pieces independently and deliver them in the changed positions.

3. In a device of the class described, a plurality of cutters, individual means for feeding the objects to the cutters, buckets for receiving the cut pieces of the objects, means for turning the buckets after they receive the cut pieces of the objects, and means for causing the buckets to deliver the cut pieces of the objects after their positions have been changed.

4. In a fish cutting machine, a plurality of rotary knives, a flat horizontal surface having grooves for receiving the lower edge of the knives, a slide on the said flat surface, said slide being adaptable to force a fish placed between the knives and the end thereof through the knives, means for moving the said slide backward and forward, a plurality of containers positioned to receive cut pieces of fish from the said knives, means for pivotally supporting the said containers and means cooperating with the means for driving the said cutters and operating the said slide to turn the said containers through an angle of ninety degrees.

5. In a fish cutting machine, a plurality of rotary knives, a flat horizontal surface having grooves for receiving the lower edge of the knives a slide on the said flat surface, said slide being adaptable to force a fish placed between the knives and the end thereof through the knives, means for moving the said slide backward and forward, a plurality of containers positioned to receive cut pieces of fish from the said knives, bottoms hinged in the said containers, means for holding the said bottoms in the closed position, means for pivotally supporting the said containers and means cooperating with the means for driving the said cutters and operating the said slide to turn the said containers through an angle of ninety degrees, and for releasing the bottoms of the said containers as they arrive at the outward position.

6. In a device of the class described, a plurality of containers positioned to receive objects from a plurality of cutters, said containers being alternately arranged in two rows, one above the other, said containers also having bottoms adaptable to automatically open and close, and means for turning the said containers through an angle of ninety degrees.

7. In a device of the class described, a plurality of containers adaptable to receive objects from a plurality of cutters, said containers being alternately arranged in two rows, one above the other, and provided with dumping means, means for turning the said containers and operating the said dumping means.

8. In a device of the class described, a cutting machine, a plurality of individual containers positioned to receive objects from the cutters of the said machine, said containers being arranged to receive objects from the said cutters, turn the said objects independently through an angle of ninety degrees and dump the said objects.

9. In a machine of the class described, a plurality of cutters, means for feeding the objects to the cutters, means for forcing objects through the cutters, and means for receiving individual pieces of the objects from the cutters and turning them independently through an angle of ninety degrees.

10. In a machine of the class described, a plurality of cutters, means for feeding fish to the cutters, means for forcing fish through the cutters, means for receiving the individual cut pieces of fish from the cutters and automatically turning them through an angle of ninety degrees and dumping them independently.

In testimony whereof I affix my signature.

OSCAR NORMAN.